US011200467B2

(12) United States Patent
Lee

(10) Patent No.: US 11,200,467 B2
(45) Date of Patent: Dec. 14, 2021

(54) ARTIFICIAL INTELLIGENCE APPARATUS AND METHOD FOR RECOGNIZING OBJECT INCLUDED IN IMAGE DATA

(71) Applicant: LG ELECTRONICS INC., Seoul (KR)

(72) Inventor: Kwangyong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 58 days.

(21) Appl. No.: 16/743,862

(22) Filed: Jan. 15, 2020

(65) Prior Publication Data

US 2021/0142127 A1 May 13, 2021

(30) Foreign Application Priority Data

Nov. 12, 2019 (KR) ........................ 10-2019-0144587

(51) Int. Cl.

*G06K 9/72* (2006.01)
*G06K 9/62* (2006.01)
*G10L 15/22* (2006.01)
*G06N 3/08* (2006.01)
*G06N 3/04* (2006.01)
*G10L 15/18* (2013.01)

(52) U.S. Cl.

CPC ............. *G06K 9/72* (2013.01); *G06K 9/6262* (2013.01); *G06N 3/04* (2013.01); *G06N 3/08* (2013.01); *G10L 15/1815* (2013.01); *G10L 15/22* (2013.01); *G06K 2209/01* (2013.01)

(58) Field of Classification Search

CPC .... G06K 9/72; G06K 9/6262; G06K 2209/01; G06N 3/04; G06N 3/08; G10L 15/1815; G10L 15/22

See application file for complete search history.

(56) References Cited

U.S. PATENT DOCUMENTS

2016/0292567 A1* 10/2016 George ................ G06N 3/0445
2017/0154128 A1* 6/2017 Pinel ....................... G06F 30/13
2020/0183989 A1* 6/2020 Krogh ................. G06F 16/9536
2020/0226667 A1* 7/2020 Kalaimani ............. G06Q 50/12
2021/0026897 A1* 1/2021 Rathje ................. G06F 16/3344
2021/0065859 A1* 3/2021 Mckinney .............. G16H 30/40
2021/0081475 A1* 3/2021 Pham .................... H04L 67/306

* cited by examiner

*Primary Examiner* — Kevin Ky

(74) *Attorney, Agent, or Firm* — Birch, Stewart, Kolasch & Birch, LLP

(57) ABSTRACT

An artificial intelligence apparatus for recognizing an object included in image data can include a camera, a communication modem, a memory configured to store an image recognition model, a natural language processing (NLP) model, and an NLP model-based image recognition model learned based on the NLP model, and a processor is configured to receive image data from the camera or the communication modem, in response to recognizing an object included in the image data using the image recognition model, generate first recognition information on the object included in the image data, and in response to the recognizing the object included in the image data using the image recognition model being unsuccessful, generate second recognition information on the object included in the image data based on recognizing the object using the NLP model-based image recognition model.

17 Claims, 13 Drawing Sheets

ARTIFICIAL INTELLIGENCE APPARATUS AND METHOD FOR RECOGNIZING OBJECT INCLUDED IN IMAGE DATA

CROSS-REFERENCE TO RELATED APPLICATIONS

This application claims priority benefit to Korean Patent Application No. 10-2019-0144587 filed in the Republic of Korea on Nov. 12, 2019, the entire contents of which are hereby incorporated by reference in its entirety.

BACKGROUND

The present disclosure relates to an artificial intelligence apparatus and method for recognizing an object included in image data.

Recently, performance of image recognition technologies using artificial intelligence has been greatly improved. However, in order to learn the image recognition model used to recognize the object included in the image data, a lot of training data is required. In order to learn the image recognition model having high recognition performance, not only the training data including image data photographed in various compositions and various situations even for a specific object is required, but also training data including image data obtained by photographing the other object, which is the same kind as the specific object, in various compositions and various situations is required.

The image recognition model does not correctly recognize a new object that is not covered by the training data used for learning, and thus, a large number of training data for the corresponding new object have to be learned to recognize the new object. Thus, if there is a method that is capable of subsidiarily providing a function of recognizing the object included in the image data using another model, or if there is a model that is capable of recognizing the object in the image data by only using little training data, the performance of the image recognition function may be more improved.

SUMMARY

Embodiments provide an artificial intelligence apparatus and method for recognizing an object included in image data by using a natural language processing (NLP) model-based image recognition model that is generated using an NLP model.

In one embodiment, provided are an artificial intelligence apparatus and method for recognizing an object included in image data by using an NLP model-based image recognition model if the recognition of the object included in the received image data by using the image recognition model has failed.

In another embodiment, provided are an artificial intelligence apparatus and method for generating an NLP model-based image recognition model having the same structure as an NLP model or an NLP model-based image recognition model including the NLP model and at least one or more layers, and learning the generated NLP model-based image recognition model by using the image training data.

In yet another embodiment, provided are an artificial intelligence apparatus and method for generating training data by using label information corresponding to image data by a user's input and updating the NLP model-based image recognition model by using the generated training data.

The details of one or more embodiments are set forth in the accompanying drawings and the description below. Other features will be apparent from the description and drawings, and from the claims.

DETAILED DESCRIPTION OF THE EMBODIMENTS

Figure 1:
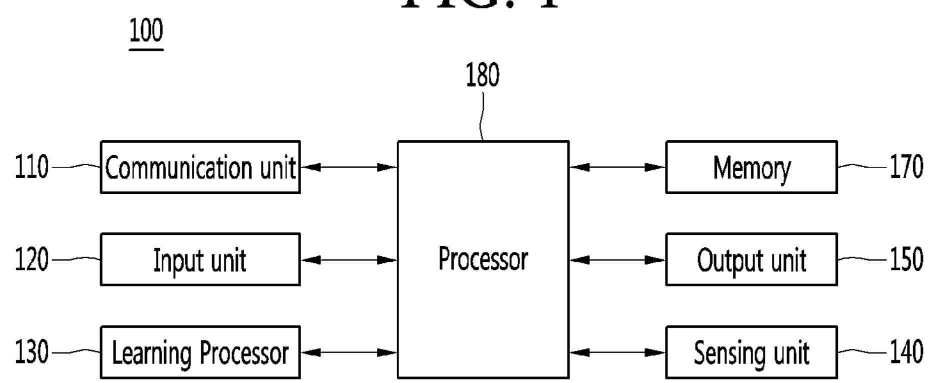
FIG. 1 is a block diagram illustrating an AI apparatus according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network infers when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

Here, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment of the present disclosure.

Hereinafter, the AI apparatus 100 may be referred to as a terminal.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication unit 110, an input unit 120, a learning processor 130, a sensing unit 140, an output unit 150, a memory 170, and a processor 180.

The communication unit 110 may transmit and receive data to and from external devices such as other **100*a* to 100*e* and the AI server 200 by using wire/wireless communication technology. For example, the communication unit 110** may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input unit 120 may acquire various kinds of data.

Here, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a training data for model learning and an input data to be used when an output is acquired by using learning model. The input unit 120 may acquire raw input data. Here, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

Here, the learning processor 130 may perform AI processing together with the learning processor 240 of the AI server 200.

Here, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing unit 140 may acquire at least one of internal information about the AI apparatus 100, ambient environment information about the AI apparatus 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

Here, the output unit 150 may include a display unit for outputting time information, a speaker for outputting auditory information, and a haptic module for outputting haptic information.

The memory 170 may store data that supports various functions of the AI apparatus 100. For example, the memory 170 may store input data acquired by the input unit 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is used to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 to drive an application program stored in memory 170. Furthermore, the processor 180 may operate two or more of the components included in the AI apparatus 100 in combination to drive the application program.

Figure 2:
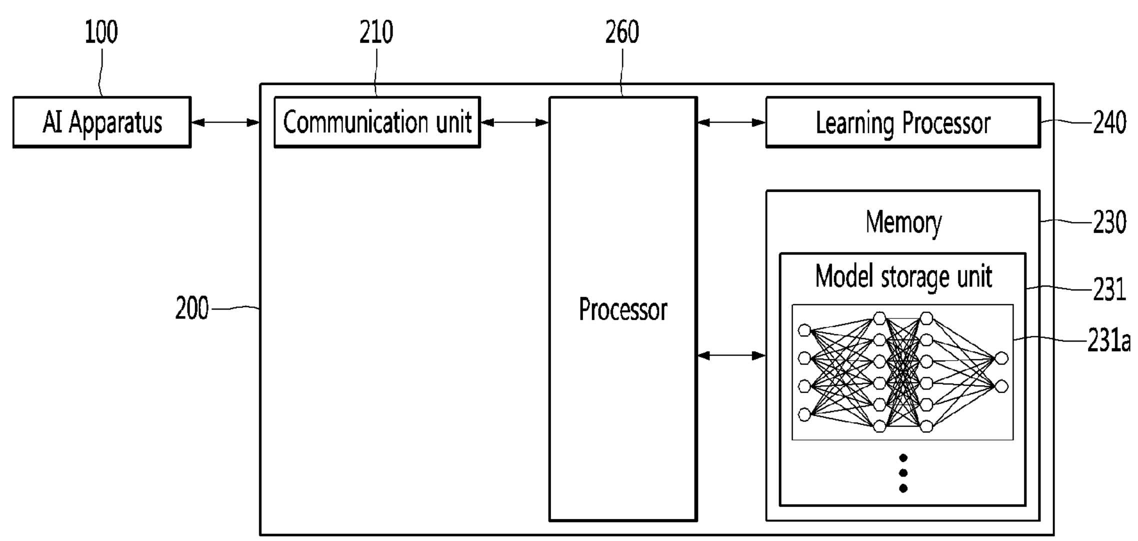
FIG. 2 is a block diagram illustrating an AI server according to an embodiment of the present disclosure.

FIG. 2 is a block diagram illustrating an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. Here, the AI server 200 may be included as a partial configuration of the AI apparatus 100, and may perform at least part of the AI processing together.

The AI server 200 may include a communication unit 210, a memory 230, a learning processor 240, a processor 260, and the like.

The communication unit 210 can transmit and receive data to and from an external device such as the AI apparatus 100.

The memory 230 may include a model storage unit 231. The model storage unit 231 may store a learning or learned model (or an artificial neural network 231*a*) through the learning processor 240.

The learning processor 240 may learn the artificial neural network 231*a* by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
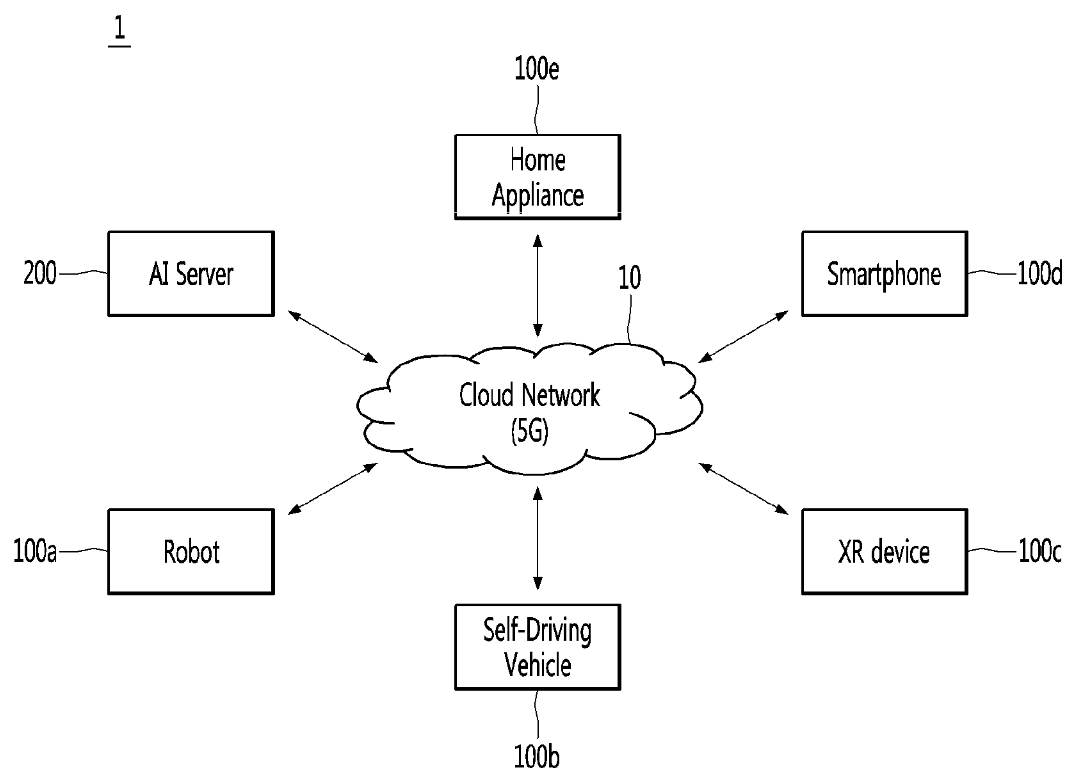
FIG. 3 is a view illustrating an AI system according to an embodiment of the present disclosure.

FIG. 3 is a view illustrating an AI system 1 according to an embodiment of the present disclosure.

Referring to FIG. 3, in the AI system 1, at least one of an AI server 200, a robot 100*a*, a self-driving vehicle 100*b*, an XR device 100*c*, a smartphone 100*d*, or a home appliance 100*e* is connected to a cloud network 10. The robot 100*a*, the self-driving vehicle 100*b*, the XR device 100*c*, the smartphone 100*d*, or the home appliance 100*e*, to which the AI technology is applied, may be referred to as AI apparatuses 100*a* to 100*e*.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100*a* to 100*e* and 200 configuring the AI system 1 may be connected to each other through the cloud network 10. In particular, each of the devices 100*a* to 100*e* and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100*a*, the self-driving vehicle 100*b*, the XR device 100*c*, the smartphone 100*d*, or the home appliance 100*e* through the cloud network 10, and may assist at least part of AI processing of the connected AI apparatuses 100*a* to 100*e*.

Here, the AI server 200 may learn the artificial neural network according to the machine learning algorithm instead of the AI apparatuses 100*a* to 100*e*, and may directly store the learning model or transmit the learning model to the AI apparatuses 100*a* to 100*e*.

Here, the AI server 200 may receive input data from the AI apparatuses 100*a* to 100*e*, may infer the result value for the received input data by using the learning model, may generate a response or a control command based on the inferred result value, and may transmit the response or the control command to the AI apparatuses 100*a* to 100*e*.

Alternatively, the AI apparatuses 100*a* to 100*e* may infer the result value for the input data by directly using the learning model, and may generate the response or the control command based on the inference result.

Hereinafter, various embodiments of the AI apparatuses 100*a* to 100*e* to which the above-described technology is applied will be described. The AI apparatuses 100*a* to 100*e* illustrated in FIG. 3 may be regarded as a specific embodiment of the AI apparatus 100 illustrated in FIG. 1.

<AI+Robot>

The robot 100*a*, to which the AI technology is applied, may be implemented as a guide robot, a carrying robot, a cleaning robot, a wearable robot, an entertainment robot, a pet robot, an unmanned flying robot, or the like.

The robot 100*a* may include a robot control module for controlling the operation, and the robot control module may refer to a software module or a chip implementing the software module by hardware.

The robot 100*a* may acquire state information about the robot 100*a* by using sensor information acquired from various kinds of sensors, may detect (recognize) surrounding environment and objects, may generate map data, may determine the route and the travel plan, may determine the response to user interaction, or may determine the operation.

The robot 100*a* may use the sensor information acquired from at least one sensor among the lidar, the radar, and the camera to determine the travel route and the travel plan.

The robot 100*a* may perform the above-described operations by using the learning model composed of at least one artificial neural network. For example, the robot 100*a* may recognize the surrounding environment and the objects by using the learning model, and may determine the operation by using the recognized surrounding information or object information. The learning model may be learned directly from the robot 100*a* or may be learned from an external device such as the AI server 200.

Here, the robot 100*a* may perform the operation by generating the result by directly using the learning model, but the sensor information may be transmitted to the external device such as the AI server 200 and the generated result may be received to perform the operation.

The robot 100*a* may use at least one of the map data, the object information detected from the sensor information, or the object information acquired from the external device to determine the travel route and the travel plan, and may control the driving unit such that the robot 100*a* travels along the determined travel route and travel plan.

The map data may include object identification information about various objects arranged in the space in which the robot 100*a* moves. For example, the map data may include object identification information about fixed objects such as walls and doors and movable objects such as pollen and desks. The object identification information may include a name, a type, a distance, and a position.

In addition, the robot 100*a* may perform the operation or travel by controlling the driving unit based on the control/interaction of the user. Here, the robot 100*a* may acquire the intention information of the interaction due to the user's operation or speech utterance, and may determine the response based on the acquired intention information, and may perform the operation.

<AI+Self-Driving>

The self-driving vehicle 100*b*, to which the AI technology is applied, may be implemented as a mobile robot, a vehicle, an unmanned flying vehicle, or the like.

The self-driving vehicle 100*b* may include a self-driving control module for controlling a self-driving function, and the self-driving control module may refer to a software module or a chip implementing the software module by hardware. The self-driving control module may be included in the self-driving vehicle 100*b* as a component thereof, but may be implemented with separate hardware and connected to the outside of the self-driving vehicle 100*b*.

The self-driving vehicle 100*b* may acquire state information about the self-driving vehicle 100*b* by using sensor information acquired from various kinds of sensors, may detect (recognize) surrounding environment and objects, may generate map data, may determine the route and the travel plan, or may determine the operation.

Like the robot 100*a*, the self-driving vehicle 100*b* may use the sensor information acquired from at least one sensor among the lidar, the radar, and the camera to determine the travel route and the travel plan.

In particular, the self-driving vehicle 100*b* may recognize the environment or objects for an area covered by a field of view or an area over a certain distance by receiving the sensor information from external devices, or may receive directly recognized information from the external devices.

The self-driving vehicle 100*b* may perform the above-described operations by using the learning model composed of at least one artificial neural network. For example, the self-driving vehicle 100*b* may recognize the surrounding environment and the objects by using the learning model, and may determine the traveling route by using the recognized surrounding information or object information. The learning model may be learned directly from the self-driving vehicle 100*a* or may be learned from an external device such as the AI server 200.

Here, the self-driving vehicle 100*b* may perform the operation by generating the result by directly using the learning model, but the sensor information may be transmitted to the external device such as the AI server 200 and the generated result may be received to perform the operation.

The self-driving vehicle 100*b* may use at least one of the map data, the object information detected from the sensor information, or the object information acquired from the external device to determine the travel route and the travel plan, and may control the driving unit such that the self-driving vehicle 100*b* travels along the determined travel route and travel plan.

The map data may include object identification information about various objects arranged in the space (for example, road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100*b* may perform the operation or travel by controlling the driving unit based on the control/interaction of the user. Here, the self-driving vehicle 100*b* may acquire the intention information of the interaction due to the user's operation or speech utterance, and may determine the response based on the acquired intention information, and may perform the operation.

<AI+XR>

The XR device 100*c*, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100*c* may analyzes three-dimensional point cloud data or image data acquired from various sensors or the external devices, generate position data and attribute data for the three-dimensional points, acquire information about the surrounding space or the real object, and render to output the XR object to be output. For example, the XR device 100*c* may output an XR object including the additional information about the recognized object in correspondence to the recognized object.

The XR device 100*c* may perform the above-described operations by using the learning model composed of at least one artificial neural network. For example, the XR device 100*c* may recognize the real object from the three-dimensional point cloud data or the image data by using the learning model, and may provide information corresponding to the recognized real object. The learning model may be directly learned from the XR device 100*c*, or may be learned from the external device such as the AI server 200.

Here, the XR device 100*c* may perform the operation by generating the result by directly using the learning model, but the sensor information may be transmitted to the external device such as the AI server 200 and the generated result may be received to perform the operation.

<AI+Robot+Self-Driving>

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100*a*, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given route without the user's control or moves for itself by determining the route by itself.

The robot 100*a* and the self-driving vehicle 100*b* having the self-driving function may use a common sensing method to determine at least one of the travel route or the travel plan. For example, the robot 100*a* and the self-driving vehicle 100*b* having the self-driving function may determine at least one of the travel route or the travel plan by using the information sensed through the lidar, the radar, and the camera.

The robot 100*a* that interacts with the self-driving vehicle 100*b* exists separately from the self-driving vehicle 100*b* and may perform operations interworking with the self-driving function of the self-driving vehicle 100*b* or interworking with the user who rides on the self-driving vehicle 100*b*.

Here, the robot 100*a* interacting with the self-driving vehicle 100*b* may control or assist the self-driving function of the self-driving vehicle 100*b* by acquiring sensor information on behalf of the self-driving vehicle 100*b* and providing the sensor information to the self-driving vehicle 100*b*, or by acquiring sensor information, generating environment information or object information, and providing the information to the self-driving vehicle 100*b*.

Alternatively, the robot 100*a* interacting with the self-driving vehicle 100*b* may monitor the user boarding the self-driving vehicle 100*b*, or may control the function of the self-driving vehicle 100*b* through the interaction with the user. For example, when it is determined that the driver is in a drowsy state, the robot 100*a* may activate the self-driving function of the self-driving vehicle 100*b* or assist the control of the driving unit of the self-driving vehicle 100*b*. The function of the self-driving vehicle 100*b* controlled by the robot 100*a* may include not only the self-driving function but also the function provided by the navigation system or the audio system provided in the self-driving vehicle 100*b*.

Alternatively, the robot 100*a* that interacts with the self-driving vehicle 100*b* may provide information or assist the function to the self-driving vehicle 100*b* outside the self-driving vehicle 100*b*. For example, the robot 100*a* may provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

<AI+Robot+XR>

The robot 100*a*, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100*a*, to which the XR technology is applied, may refer to a robot that is subjected to control/interaction in an XR image. In this situation, the robot 100*a* may be separated from the XR device 100*c* and interwork with each other.

When the robot 100*a*, which is subjected to control/interaction in the XR image, may acquire the sensor information from the sensors including the camera, the robot 100*a* or the XR device 100*c* may generate the XR image based on the sensor information, and the XR device 100*c* may output the generated XR image. The robot 100*a* may operate based on the control signal input through the XR device 100*c* or the user's interaction.

For example, the user can confirm the XR image corresponding to the time point of the robot 100*a* interworking remotely through the external device such as the XR device 100*c*, adjust the self-driving travel path of the robot 100*a* through interaction, control the operation or driving, or confirm the information about the surrounding object.

<AI+Self-Driving+XR>

The self-driving vehicle 100*b*, to which the AI technology and the XR technology are applied, may be implemented as a mobile robot, a vehicle, an unmanned flying vehicle, or the like.

The self-driving driving vehicle 100*b*, to which the XR technology is applied, may refer to a self-driving vehicle having a means for providing an XR image or a self-driving vehicle that is subjected to control/interaction in an XR image. Particularly, the self-driving vehicle 100*b* that is subjected to control/interaction in the XR image may be distinguished from the XR device 100*c* and interwork with each other.

The self-driving vehicle 100*b* having the means for providing the XR image may acquire the sensor information from the sensors including the camera and output the generated XR image based on the acquired sensor information. For example, the self-driving vehicle 100*b* may include an HUD to output an XR image, thereby providing a passenger with a real object or an XR object corresponding to an object in the screen.

Here, when the XR object is output to the HUD, at least part of the XR object may be output to overlap the actual object to which the passenger's gaze is directed. Meanwhile, when the XR object is output to the display provided in the self-driving vehicle 100*b*, at least part of the XR object may be output to overlap the object in the screen. For example, the self-driving vehicle 100*b* may output XR objects corresponding to objects such as a lane, another vehicle, a traffic light, a traffic sign, a two-wheeled vehicle, a pedestrian, a building, and the like.

When the self-driving vehicle 100*b*, which is subjected to control/interaction in the XR image, may acquire the sensor information from the sensors including the camera, the self-driving vehicle 100*b* or the XR device 100*c* may generate the XR image based on the sensor information, and the XR device 100*c* may output the generated XR image. The self-driving vehicle 100*b* may operate based on the control signal input through the external device such as the XR device 100*c* or the user's interaction.

Figure 4:
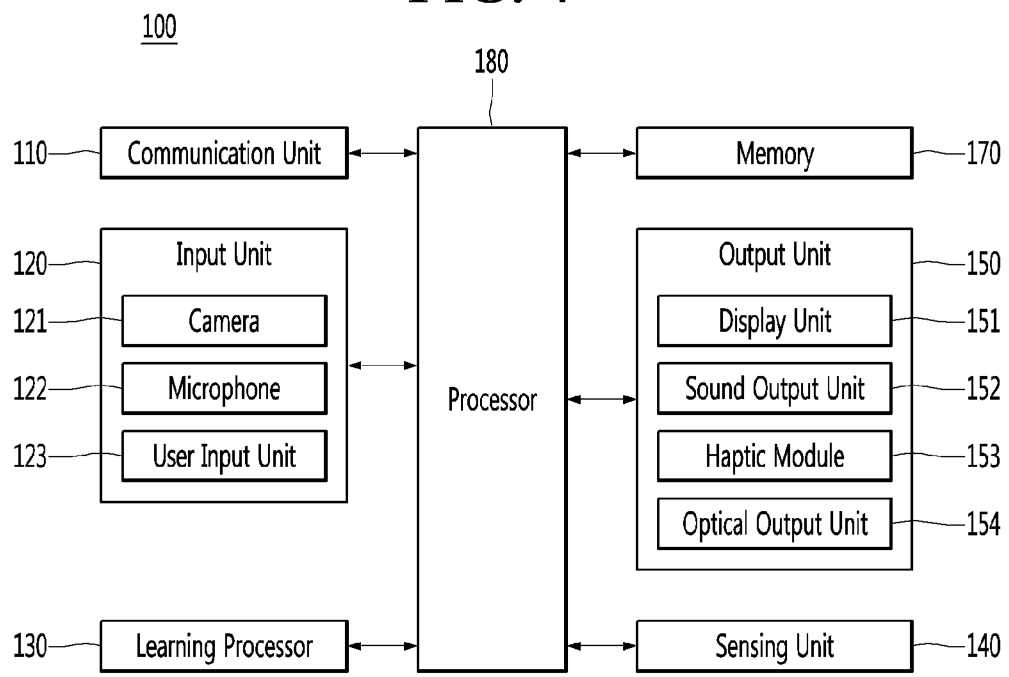
FIG. 4 is a block diagram illustrating an AI apparatus according to an embodiment of the present disclosure.

FIG. 4 is a block diagram illustrating an AI apparatus 100 according to an embodiment of the present disclosure.

The redundant repeat of FIG. 1 will be omitted below.

The communication unit 110 may also be referred to as a communication modem or a communication circuit.

Referring to FIG. 4, the input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information input from a user and the AI apparatus 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the AI apparatus 100. Moreover, various noise canceling algorithms for removing noise occurring during the reception of external sound signals may be implemented in the microphone 122.

The user input unit 123 is to receive information from a user and when information is input through the user input unit 123, the processor 180 may control an operation of the AI apparatus 100 to correspond to the input information.

The user input unit 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

The sensing unit 140 may also be referred to as a sensor unit.

The output unit 150 may include at least one of a display unit 151, a sound output module 152, a haptic module 153, or an optical output module 154.

The display unit 151 may display (output) information processed in the AI apparatus 100. For example, the display unit 151 may display execution screen information of an application program running on the AI apparatus 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the AI apparatus 100 and a user, and an output interface between the AI apparatus 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI apparatus 100. An example of an event occurring in the AI apparatus 100 includes message reception, call signal reception, missed calls, alarm, schedule notification, e-mail reception, and information reception through an application.

Figure 5:
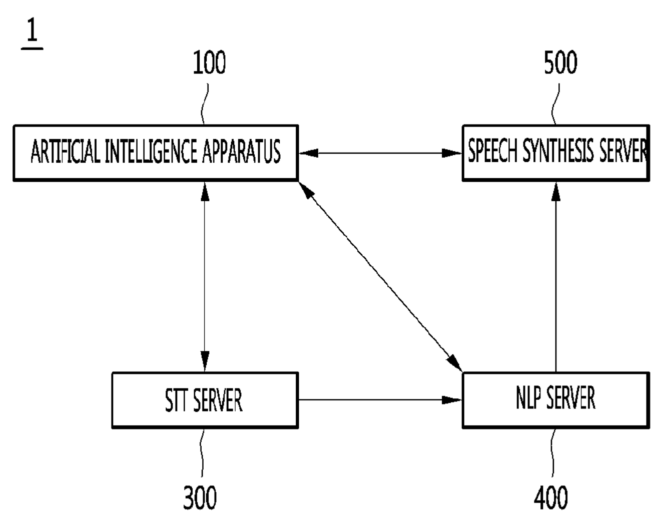
FIG. 5 is a block diagram illustrating an AI system according to an embodiment of the present disclosure.

FIG. 5 is a block diagram illustrating an AI system 1 according to an embodiment of the present disclosure.

Referring to FIG. 5, the AI system 1 may include an AI apparatus 100, a speech-to-text (STT) server 300, a natural language processing (NLP) server 400 and a speech synthesis server 500.

The AI apparatus 100 may transmit speech data to the STT server 300. The STT server 300 may convert the speech data received from the AI apparatus 100 into text data. The NLP server 400 may receive text data from the STT server 300. The NLP server 400 may analyze the intent of the text data based on the received text data. The NLP server 400 may transmit intent analysis information indicating the result of analyzing the intent to the AI apparatus 100 or the speech synthesis server 500. The speech synthesis server 500 may generate a synthesis speech reflecting the intent of the user based on the intent analysis information and transmit the generated synthesis speech to the AI apparatus 100.

The STT server 300 may increase accuracy of speech-to-text conversion using a language model. The language model may mean a model capable of calculating a probability of a sentence or calculating a probability of outputting a next word when previous words are given. For example, the language model may include probabilistic language models such as a unigram model, a bigram model and an N-gram model. The unigram is a model that assumes that all words are completely independent of each other and calculates a probability of a word sequence as a product of probabilities of words. The bigram model is a model that assumes that use of a word depends on only one previous word. The N-gram model is a model that assume that use of a word depends on previous (n−1) words.

That is, the STT server 300 may determine whether the converted text data is appropriately converted from the speech data using a language model, thereby increasing accuracy of conversion from the speech data into the text data.

The NLP server 400 may sequentially perform a morpheme analysis step, a syntax analysis step, a speech-act analysis step, an interaction processing step with respect to text data, thereby generating intent analysis information.

The morpheme analysis step refers to a step of classifying the text data corresponding to the speech uttered by the user into morphemes as a smallest unit having a meaning and determining the part of speech of each of the classified morphemes. The syntax analysis step refers to a step of classifying the text data into a noun phrase, a verb phrase, an adjective phrase, etc. using the result of the morpheme analysis step and determining a relation between the classified phrases. Through the syntax analysis step, the subject, object and modifier of the speech uttered by the user may be determined. The speech-act analysis step refers to a step of analyzing the intent of the speech uttered by the user using the result of the syntax analysis step. Specifically, the speech-act step refers to a step of determining the intent of a sentence such as whether the user asks a question, makes a request, or expresses simple emotion. The interaction processing step refers to a step of determining whether to answer the user's utterance, respond to the user's utterance or question about more information, using the result of the speech-act step.

The NLP server 400 may generate intent analysis information including at least one of the answer to, a response to, or a question about more information on the intent of the user's utterance, after the interaction processing step.

Meanwhile, the NLP server 400 may receive the text data from the AI apparatus 100. For example, when the AI apparatus 100 supports the speech-to-text conversion function, the AI apparatus 100 may convert the speech data into the text data and transmit the converted text data to the NLP server 400.

The speech synthesis server 500 may synthesize prestored speech data to generate a synthesized speech. The speech synthesis server 500 may record the speech of the user selected as a model and divide the recorded speech into syllables or words. The speech synthesis server 500 may store the divided speech in an internal or external database in syllable or word units.

The speech synthesis server 500 may retrieve syllables or words corresponding to the given text data from the database and synthesize the retrieved syllables or words, thereby generating the synthesized speech.

The speech synthesis server 500 may store a plurality of speech language groups respectively corresponding to a plurality of languages. For example, the speech synthesis server 500 may include a first speech language group recorded in Korean and a second speech language group recorded in English.

The speech synthesis server 500 may translate text data of a first language into text of a second language and generate a synthesized speech corresponding to the translated text of the second language using the second speech language group.

The AI system 1 may further include an AI server 200. The AI server 200 may learn at least one of an STT engine used in the STT server 300, an NLP engine used in the NLP server 400 or a speech synthesis engine used in the speech synthesis server 500. That is, at least one of the STT server 300, the NLP server 400 or the speech synthesis server 500 may use models or engines trained in the AI server 200.

Although the AI apparatus 100, the STT server 300, the NLP server 400 and the speech synthesis server 500 are shown as being divided in FIG. 5, the present disclosure is not limited thereto. In one embodiment, some of the AI server 200, the STT server 300, the NLP server 400 or the speech synthesis server 500 may be configured as one server. In one embodiment, some of the STT server 300, the NLP server 400 or the speech synthesis server 500 may be included in the AI apparatus 100. This means that the AI apparatus 100 performs the function of the STT server 300, the NLP server 400 or the speech synthesis server 500.

Figure 6:
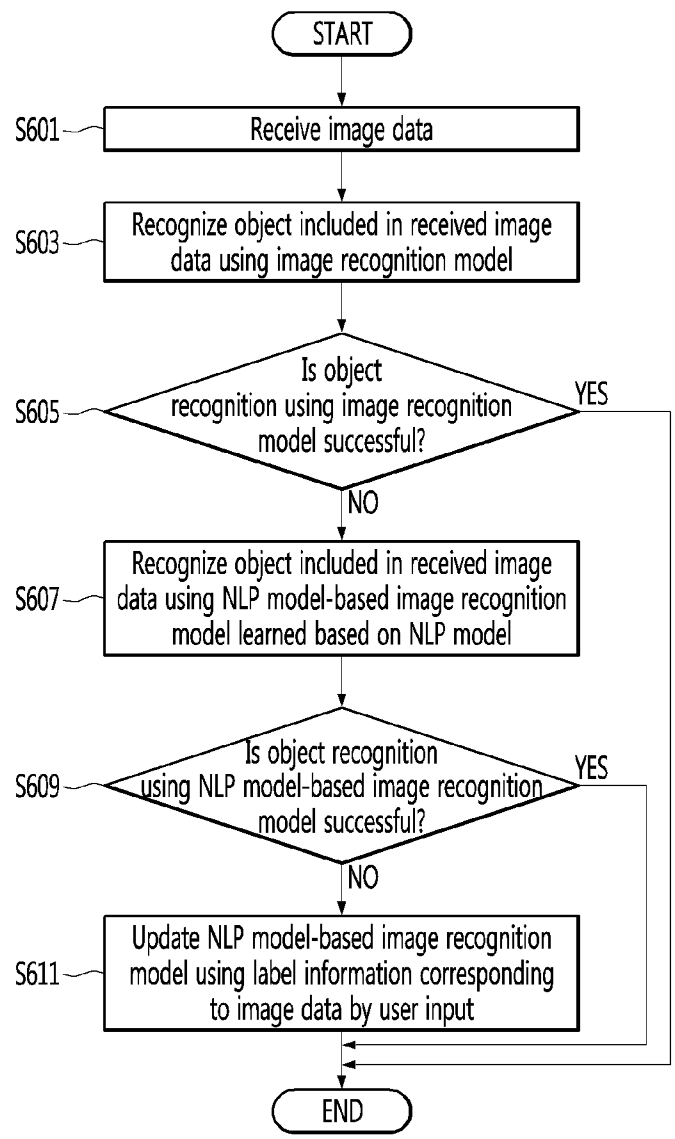
FIG. 6 is a flowchart illustrating a method for recognizing an object included in image data according to an embodiment of the present disclosure.

FIG. 6 is a flowchart illustrating a method for recognizing an object included in image data according to an embodiment of the present disclosure.

Referring to FIG. 6, a processor 180 of the artificial intelligence apparatus 100 receives image data (S601).

The processor 180 may receive the image data through a camera 121 or may receive the image data photographed by an external device through a communication unit 110. The external device may include various devices equipped with cameras, such as a user terminal, a head mounted display (HMD), a CCTV, a robot, and an IoT camera. For example, the processor 180 may receive image data from a mobile robot equipment with a camera or an IoT camera through the communication unit 110.

The image data may include a recognition target object. The image data may include RGB image data, IR image data, depth image data, RGB-D image data, and the like.

That is, the camera 121 may include an RGB camera capable of capturing RGB images, an IR camera capable of capturing IR images, a depth camera capable of capturing Depth images, an RGB-D camera capable of capturing RGB-D images, and the like.

Also, the processor 180 of the artificial intelligence apparatus 100 recognizes an object included in the received image data by using an image recognition model (S603).

The image recognition model may mean a model that recognizes an object included in the input image data to output recognition information when image data is input. The image recognition model includes an artificial neural network and may be learned using a machine learning algorithm or a deep learning algorithm. In detail, the image recognition model may include a convolutional neural network (CNN) and may be learned to recognize an object included in the image data by using color or depth information for each pixel of the input image data.

The image recognition model may be learned using image training data, and the image training data may include recognition image data for learning and objects included in the training image data. The recognition information on the object included in the training image data may be referred to as label information.

In an embodiment of the present disclosure, the processor 180 or a learning processor 130 may learn the image recognition model by using the image training data and store the learned image recognition model in a memory 170. In another embodiment, the processor 260 or the learning processor 240 of an artificial intelligence server 200 may learn an image recognition model by using the image training data and then store the learned image recognition model in the memory of the artificial intelligence serve 200 or transmit the learned image recognition model to the artificial intelligence apparatus 100 through the communication unit 210 to store the learned image recognition model in the memory 170 of the artificial intelligence apparatus 100.

In an embodiment, the processor 180 may recognize an object included in the input image data by using the image recognition model stored in the memory 170. In another embodiment, the processor 180 may transmit the image data input through the communication unit 110 to the artificial intelligence server 200, the processor 260 of the artificial intelligence server 200 may recognize an object included in the image data by using the image recognition model stored in the memory 230 to generate recognition information, and the processor 260 of the artificial intelligence server 200 may transmit the generated recognition information to the artificial intelligence apparatus 100 through the communication unit 210.

Also, the processor 180 of the artificial intelligence apparatus 100 determines whether the recognition of the object using the image recognition model is successful (S605).

The successful recognition of the object may mean that the object recognition information corresponding to the received image data using the image recognition model has been successfully generated and also may mean that object recognition information, which means that one of the objects that are capable of being recognized or identified in the image recognition model is recognized, is generated.

On the other hand, although the object recognition attempts from the image data using the image recognition model, if the object included in the image data is not determined as one of objects that are capable of being recognized or identified through the existing learning, or if the object included in the image data is determined as the one of the objects with a recognition reliability lower than a predetermined reference value, or if the object included in the image data is determined as an unknown object, it may be determined that the recognition of the object has failed.

The image recognition model may output a value representing possibility or reliability in which the object included in the input image data corresponds to a recognizable object in the output layer. For example, when the image recognition model is a model for distinguishing whether the object included in the input image is a dog, a cat, a horse, or a rabbit, the output layer of the image recognition model may output a possibility or probability that the object included in the input image data is the dog, the cat, the horse, or the rabbit.

In an embodiment, the image recognition model may be an open set recognition (OSR) model that distinguishes the learned object and the object, which is not learned, from each other.

As the result of the determination in step S605, when the recognition of the object using the image recognition model has failed, the processor 180 of the artificial intelligence apparatus 100 attempts to recognize the object included in the image data received using the NLP model-based image recognition model that is learned based on a natural language processing (NLP) model (S607).

The image recognition model is a model for recognizing the object included in the input image data when the image data is input, but it requires a large amount of image training data for training. That is, although the image recognition model is learned to additionally recognize only one object, the image recognition model has to be learned using various image data including the object. For example, the image training data for recognizing a vehicle may include image data photographed in various directions or compositions even in one vehicle and image data photographed in various directions or compositions of various vehicles. However, if the recognition of the object included in the image data by using the image recognition model has failed, even though the training data is generated using the currently input image data, the generated training data may be insufficient to improve the performance of the image recognition model. Thus, the processor 180 of the artificial intelligence apparatus 100 may attempt to recognize an object included in the received image data by using the NLP model-based image recognition model learned based on the NLP model.

The NLP model (or NLP engine) may mean a model that outputs information on an object corresponding to the input text or string when text or string is input. The NLP model may include an artificial neural network and may be learned using a machine learning algorithm or a deep learning algorithm. In detail, the NLP model may include a convolutional neural network (CNN) and be learned so that the input layer of the NLP engine receives a matrix, which is generated by concatenating vectors, in which a text is embedded and converted, to each other to determine an object corresponding to the meaning or intention of the input text. For example, when the text “a machine flying in the sky” is input, the NLP model may output recognition information corresponding to “an airplane” as an output.

The NLP model may be learned using text training data, and the text training data may include text data for training and recognition information on an object corresponding to the text data for training. The recognition information on the object included in the text data for training may be referred to as label information. The NLP model may be learned in consideration of a part of speech (POS), tokenizer, negation, named entities, dependency, or co-references.

In an embodiment of the present disclosure, the processor 180 or the learning processor 130 may learn the NLP model by using the text training data and store the learned NLP model in the memory 170. In another embodiment, the processor 260 or the learning processor 240 of the artificial intelligence server 200 may learn the NLP model by using the text training data and then store the learned NLP model in the memory of the artificial intelligence serve 200 or transmit the learned NLP model to the artificial intelligence apparatus 100 through the communication unit 210 to store the learned NLP model in the memory 170 of the artificial intelligence apparatus 100.

In an embodiment, the processor 180 may recognize an object corresponding to the input text data by using the NLP model stored in the memory 170. In another embodiment, the processor 180 may transmit the text data input through the communication unit 110 to the artificial intelligence server 200, the processor 260 of the artificial intelligence server 200 may recognize an object corresponding to the text data by using the NLP model stored in the memory 230 to generate recognition information, and the processor 260 of the artificial intelligence server 200 may transmit the generated recognition information to the artificial intelligence apparatus 100 through the communication unit 210.

Since the NLP model is learned to recognize the object corresponding to the input text, if the image recognition model that recognizes the object included in the image data is learned based on the well learned NLP model, is it possible to establish a model that is capable of recognizing the object by using only a small amount of image training data.

The NLP model-based image recognition model may mean an image recognition model that is learned based on the NLP model. When the image data is input, the NLP model-based image recognition model may mean a model that outputs information on an object included in the input image data. The NLP model-based image recognition model may include an artificial neural network and may be learned using a machine learning algorithm or a deep learning algorithm. The NLP model-based image recognition model may have the same structure as the NLP model or may have a structure further including the NLP model and at least one additional layer. The additional layer may be an input layer, a hidden layer, or an output layer. Accordingly, the NLP model-based image recognition model may include a convolutional neural network (CNN), and the input layer of the NLP model-based image recognition model may receive image data and be learned to recognize an object included in the image data. For example, if the NLP model is learned to output recognition information corresponding to "an airplane" as its output when the text "a machine flying in the sky" is input, the NLP model-based image recognition model may be learned based on the NLP model to output recognition information corresponding to the "airplane" as its output when the image data including "the airplane" is input.

Like the image recognition model, the NLP model-based image recognition model may be learned using image training data, and the image training data may include image data for training and recognition information on an object included in the image data for training. The recognition information on the object included in the training image data may be referred to as label information.

In an embodiment of the present disclosure, the processor 180 or a learning processor 130 may learn the NLP model-based image recognition model by using the image training data and the NLP model and store the learned NLP model-based image recognition model in a memory 170 In another embodiment, the processor 260 or the learning processor 240 of an artificial intelligence server 200 may learn the NLP model-based image recognition model by using the image training data and the NLP model and then store the learned NLP model-based image recognition model in the memory of the artificial intelligence serve 200 or transmit the learned NLP model-based image recognition model to the artificial intelligence apparatus 100 through the communication unit 210 to store the learned NLP model-based image recognition model in the memory 170 of the artificial intelligence apparatus 100.

In an embodiment, the processor 180 may recognize an object included in the input image data by using the NLP model-based image recognition model stored in the memory 170. In another embodiment, the processor 180 may transmit the image data input through the communication unit 110 to the artificial intelligence server 200, the processor 260 of the artificial intelligence server 200 may recognize an object included in the image data by using the NLP model-based image recognition model stored in the memory 230 to generate recognition information, and the processor 260 of the artificial intelligence server 200 may transmit the generated recognition information to the artificial intelligence apparatus 100 through the communication unit 210.

Also, the processor 180 of the artificial intelligence apparatus 100 determines whether the recognition of the object using the NLP model-based image recognition model is successful (S609).

The successful recognition of the object may mean that the object recognition information corresponding to the received image data using the NLP model-based image recognition model has been successfully generated and also may mean that object recognition information, which means that one of the objects that are capable of being recognized or identified in the NLP model-based image recognition model is recognized, is generated.

On the other hand, although the object recognition attempts from the NLP model-based image data using the image recognition model, if the object included in the image data is not determined as one of objects that are capable of being recognized or identified through the existing learning, or if the object included in the image data is determined as the one of the objects with a recognition reliability lower than a predetermined reference value, or if the object included in the image data is determined as an unknown object, it may be determined that the recognition of the object has failed.

As the result of the determination in step S609, when the object recognition using the NLP model-based image recognition model has failed, the processor 180 of the artificial intelligence apparatus 100 may update the NLP model-based image recognition model by using label information corresponding to the image data by the user's input (S611).

In an embodiment, the processor 180 of the artificial intelligence apparatus 100 may output a request for an input of information on the object included in the image data through a display unit 151 or an audio output unit 152 in a video or audio form and also may receive the user's input through a microphone 122 or a user input unit to acquire the label information. In another embodiment, the processor 180 of the artificial intelligence apparatus 100 may transmit an output signal for outputting the request for the input of the information on the object included in the image data to an external terminal connected thereto through the communication unit 110 and receive the label information received from the user to the external terminal through the communication unit 110. For example, the artificial intelligence apparatus 100 may be connected to an AR terminal through the communication unit 110, transmit an output signal for outputting an image corresponding to image data acquired in the AR terminal through the communication unit 110, and receive the label information on the object included in the image data by the user's input from the AR terminal.

According to an embodiment, the processor 180 or the learning processor 130 of the artificial intelligence apparatus 100 may generate training data including the image data and the acquired label information based on the label information acquired by the user's input and update the NLP model-based image recognition model by using the generated training data. In another embodiment, the processor 180 of the artificial intelligence apparatus 100 may generate the training data including the image data and the acquired label information and transmit the generated training data and the NLP model-based image recognition mode to the artificial intelligence server 200 through the communication unit 110. The processor 260 or the learning processor 240 of the artificial intelligence server 200 may update the NLP model-based image recognition model by using the received training data, and the artificial intelligence server 200 may transmit the updated NLP model-based image recognition model to the artificial intelligence apparatus 100 through the communication unit 210.

The generated training data may be used for learning (or updating) the NLP model-based image recognition model or may be used for learning (or updating) the image recognition model. However, as described above, since learning (or updating) of the image recognition model requires a large number of image data even for a single object, it may be more effective to train the NLP model based image recognition model.

When the object recognition using the image recognition model is successful as the result of the determination in step S605, or when the object recognition using the NLP model-based image recognition model is successful as the result of the determination in step S609, a process of allowing the processor 180 to recognize the object included in the image data is ended. For example, the processor 180 of the artificial intelligence apparatus 100 may output information corresponding to the recognized object.

In an embodiment, the processor 180 may generate the training data using the label information corresponding to the image data input by the user even though the object recognition using the NLP model-based image recognition model is successful and then update the NLP mode-based image model by using the generated training data.

According to the method illustrated in FIG. 6, in an embodiment of the present disclosure, the artificial intelligence apparatus 100 attempts to recognize the object included in the image data by using the NLP model-based image recognition model when the recognition of the object included in the image data by using the image recognition mode has failed. Here, the artificial intelligence apparatus 100 attempts to recognize the object by using the NLP model-based image recognition model instead of the image recognition model and further updates the NLP model-based image recognition model by using the generated training data. This is done because a large number of image training data is required for learning of the image recognition model to recognize the object in the image data. On the other hand, since the NLP model-based image recognition model is a model that is generated and learned based on the previously learned NLP model, an object may be recognized from the image data by the NLP model-based image recognition model even though only a small amount of image training data is used for learning.

FIG. 6 illustrates only one cycle of a method for recognizing the object included in the image data according to an embodiment. The steps illustrated in FIG. 6 may be repeatedly performed. Accordingly, the artificial intelligence apparatus 100 may repeatedly recognize the object included in the image data.

An order of the steps illustrated in FIG. 6 is merely an example, and the present disclosure is not limited thereto. That is, in an embodiment, the order of some of the steps illustrated in FIG. 6 may be reversed. Also, in an embodiment, some of the steps illustrated in FIG. 6 may be performed in parallel.

Figure 7:
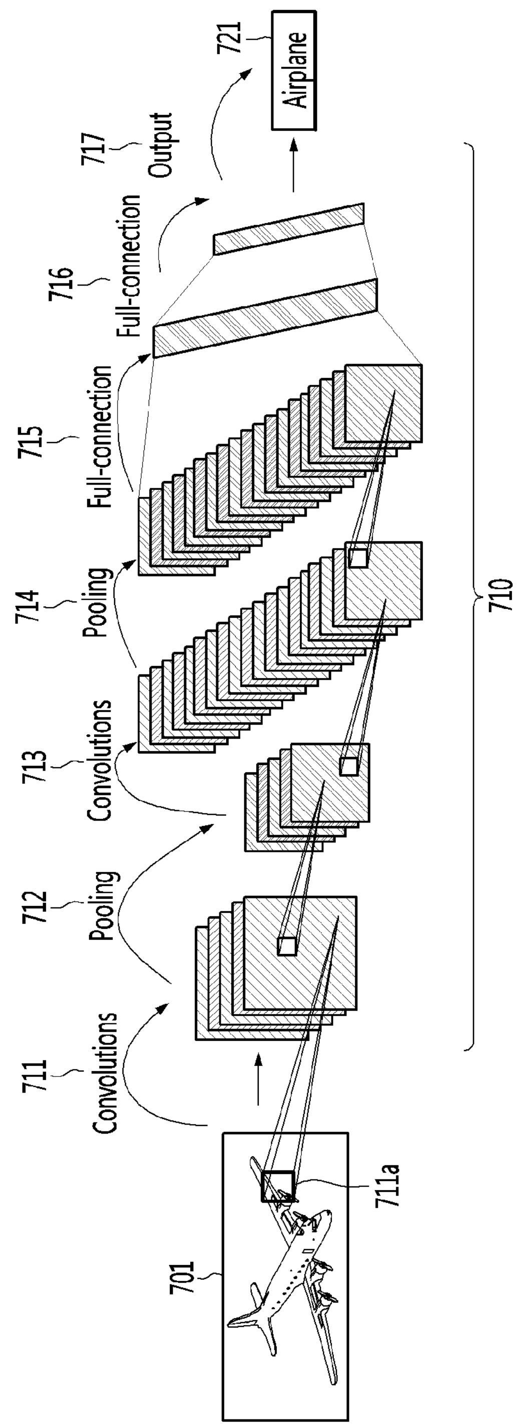
FIG. 7 is a view illustrating an example of an image recognition model according to an embodiment of the present disclosure.

FIG. 7 is a view illustrating an example of the image recognition model according to an embodiment of the present disclosure.

Referring to FIG. 7, the image recognition model 710 may receive image data 701, recognize an object included in the received image data 701, and output object recognition information 721.

The image recognition model 710 may be provided as an artificial neural network including a convolutional neural network. For example, the image recognition model 710 may include a first convolutional layer 711, a first pooling layer 712, a second convolutional layer 713, a second pooling layer 714, a first fully-connected layer 715, and a second fully-connected layer 716. Thus, the image recognition model 710 may output 717 object recognition information 721 through the layers. The structure of the image recognition model 710 illustrated in FIG. 7 is merely one example, and the structure of the artificial neural network constituting the image recognition model 710 is not limited to the structure illustrated in FIG. 7.

In the image recognition model 710, the image data 701 may be input in the form of a matrix including information for each pixel (e.g., RGB values). Also, the input matrix may perform convolution or pooling by using a predetermined filter (e.g., 711*a*) in the convolutional layers 711 and 713 and the pooling layers 712 and 714. Although the predetermined filter (e.g., 711*a*) is illustrated in a square shape in FIG. 7, the present disclosure is not limited thereto. For example, the filter used in the convolutional layer or the pooling layer may have a rectangular shape.

If the image data 701 is image data including an airplane, the image recognition model 710 may output information including "airplane" as the object recognition information 721.

The image recognition model 710 may be learned using training data including the image data 701 and object recognition information 721 as label information corresponding thereto.

Figure 8:
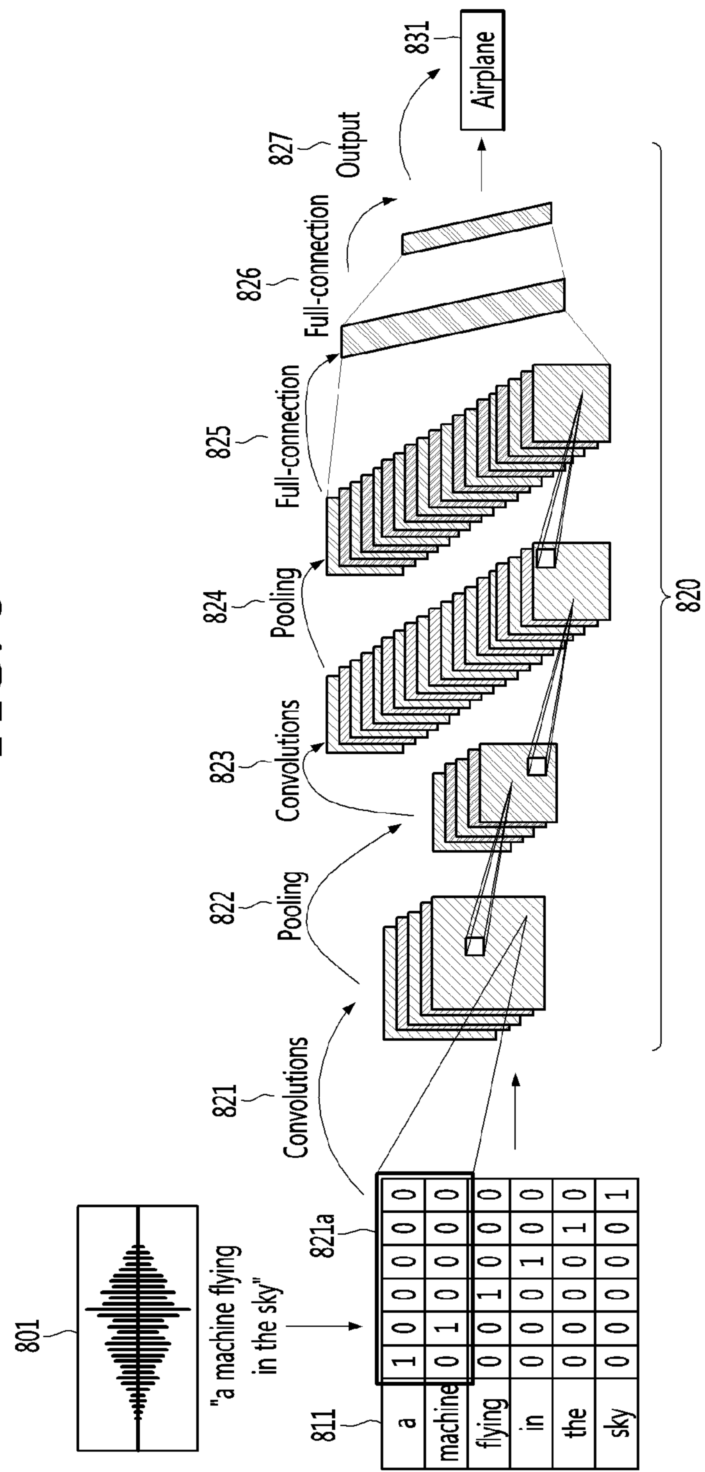
FIG. 8 is a view illustrating an example of an NLP model according to an embodiment of the present disclosure.

FIG. 8 is a view illustrating an example of the NLP model according to an embodiment of the present disclosure.

Referring to FIG. 8, words included in speech data 801 are converted into vectors based on word embedding, and a matrix or word embedding matrix 811 generated by concatenating the converted embedding vectors to each other is input, the NLP model 820 may output object recognition information 831 corresponding to the input word embedding matrix 811.

The NLP model 820 may be provided as an artificial neural network including a convolutional neural network. For example, the image recognition model 820 may include a first convolutional layer 821, a first pooling layer 822, a second convolutional layer 823, a second pooling layer 824, a first fully-connected layer 825, and a second fully-connected layer 826. Thus, the image recognition model 820 may output 827 object recognition information 831 through the layers. The structure of the image recognition model 820 illustrated in FIG. 8 is merely one example, and the structure of the artificial neural network constituting the image recognition model 820 is not limited to the structure illustrated in FIG. 8.

In the NLP model 820, voice data 801 may be input in the form of a matrix such as the word embedding matrix 811 by using the word embedding technique. Also, the input matrix may perform convolution or pooling by using a predetermined filter (e.g., 821*a*) in the convolutional layers 821 and 823 and the pooling layers 822 and 824. Although the predetermined filter (e.g., 821*a*) is illustrated in a rectangular shape in FIG. 8, the present disclosure is not limited thereto. Since the word embedding matrix 811 is a matrix generated by converting each word into a vector by the word embedding technique and concatenating the converted vectors to each other, one row corresponds to one word in the word embedding matrix 811. Accordingly, the filter used for the word embedding matrix 811 may be set to have a rectangular shape to include all of at least one or more rows.

The word embedding matrix 811 illustrated in FIG. 8 may be a matrix generated by concatenating a vector represented in the form of one hot vector for each word and may be merely an example. Therefore, according to an embodiment of the present disclosure, a dimension of the word embedding matrix 811 and a vector corresponding to each word may be variously set.

If the voice data 801 is voice data including a voice "a machine flying in the sky" describing the plane, the image recognition model 820 may output information including the "airplane" as object recognition information 831 corresponding to the voice data 801.

The NLP model 820 may be learned using training data including the word embedding matrix 811 and the object recognition image data 831 as label information corresponding to the word embedding matrix 811. Alternatively, the NLP model 820 may be learned using training data including a text converted from the voice data 801 and object recognition information 831 as label information corresponding to the text.

Figure 9:
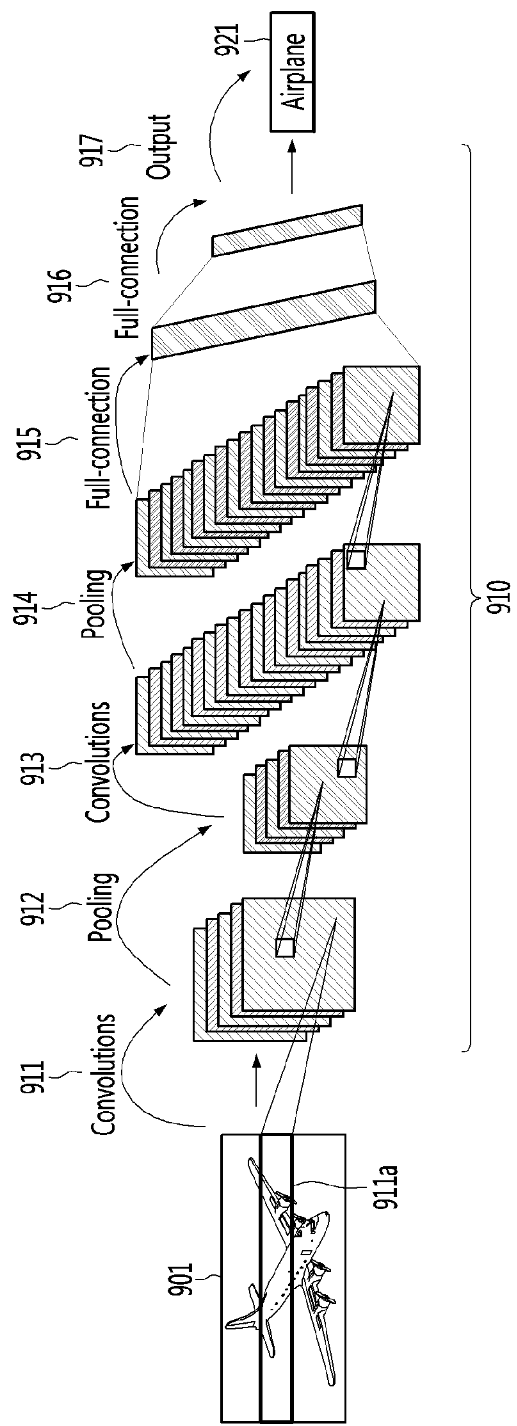
FIG. 9 is a view illustrating an example of an NLP model-based image recognition model according to an embodiment of the present disclosure.

FIG. 9 is a view illustrating an example of the NLP model-based image recognition model according to an embodiment of the present disclosure.

Referring to FIG. 9, an NLP model-based image recognition model 910 may be configured to include the NLP model 820 illustrated in FIG. 8. For example, the NLP model-based image recognition model 910 may have the same structure as the NLP model 820 or may have a structure further including the NLP model 820 and other additional layers. The NLP model-based image recognition model 910 is constructed based on the previously trained NLP model 820. When image data 901 is input, the NLP model-based image recognition model 910 may be learned to recognize an object included in the input image data 901, thereby outputting object recognition information 921.

The NLP model-based image recognition model 910 illustrated in FIG. 9 may have the same structure as the NLP model 820 illustrated in FIG. 8. Also, the NLP model-based image recognition model 910 may include a first convolutional layer 911, a first pooling layer 912, a second convolutional layer 913, a second pooling layer 914, a first fully-connected layer 915, and a second fully-connected layer 916. Thus, the NLP model-based image recognition model 910 may output 917 object recognition information 921 through the layers. The structure of the NLP model-based image recognition model 910 illustrated in FIG. 9 is merely one example, and the structure of the artificial neural network constituting the NLP model-based image recognition model 910 is not limited to the structure illustrated in FIG. 9.

A filter used for the image data 901 in the NLP model-based image recognition model 910 may be set to have a rectangular shape to include all of at least one or more rows of the image data 901, like the situation of the NLP model 820.

In order to input the image data 901 to the NLP model-based image recognition model 910, pre-processing may be performed on the image data 901, and the pre-processing may include noise removal and size change.

If the image data 901 is image data including an airplane, the NLP model-based image recognition model 910 may output information including "airplane" as the object recognition information 921.

The NLP model-based image recognition model 910 may be learned using training data including the image data 901 and object recognition information 921 as label information corresponding thereto.

Figure 10:
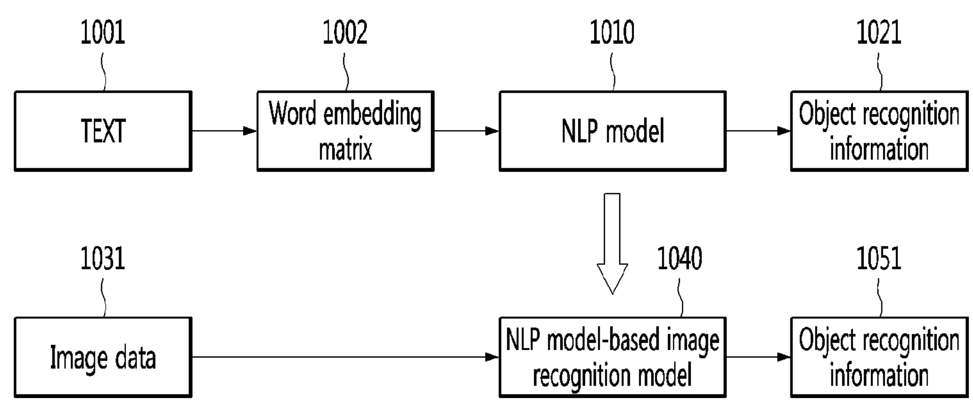
FIG. 10 is a view illustrating a relationship between the NLP model and the NLP model-based image recognition model according to an embodiment of the present disclosure.

FIG. 10 is a view illustrating a relationship between the NLP model and the NLP model-based image recognition model according to an embodiment of the present disclosure.

Referring to FIG. 10, when a word embedding matrix 1002 generated from a text 1001 is input, an NLP model 1010 may be a model that outputs object recognition information 1021 on an object corresponding to the input word embedding matrix 1002. The text 1001 used for generating the word embedding matrix 1002 may be a text in which voice data is converted by using a speed to text (STT) model.

An NLP model-based image recognition model 1040 may be a model that outputs object recognition information 1051 on an object included in input image data 1031 when the image data 1031 is input.

The NLP model-based recognition model 1040 may be generated and learned based on an NLP model 1010 that outputs object recognition information 1021 corresponding to the text 1001. The NLP model-based image recognition model 1040 may be a model that is learned using a transfer learning technique in that the NLP model-based image recognition model 1040 is generated based on the NLP model 1010 and learned using additional training data. The transfer learning may be one of the learning techniques in deep learning and be used to generate and learn a new model by using a previously learned model and also used to change a domain to which the learned model is applied. Information on the previously learned model (e.g., a model parameter) may be used as knowledge or information about a new model. The learning or relearning of a model that is newly generated from the previously trained model may be referred to as fine-tuning.

Figure 11:
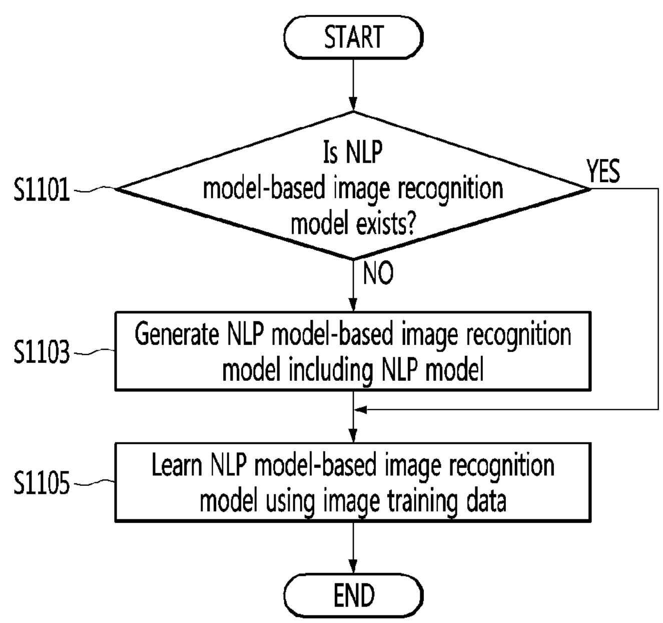
FIG. 11 is a flowchart illustrating a method for learning the NLP model-based image recognition model according to an embodiment of the present disclosure.

FIG. 11 is a flowchart illustrating a method for learning the NLP model-based image recognition model according to an embodiment of the present disclosure.

A method for learning an NLP model-based image recognition model may be performed before the step S607 of recognizing the object included in the image data received using the NLP model-based image recognition model illustrated in FIG. 6 and also be performed in step S611 of updating the NLP model-based image recognition model illustrated in FIG. 6.

Referring to FIG. 11, a processor 180 or a learning processor 130 of an artificial intelligence apparatus 100 determines whether an NLP model-based image recognition model exists (S1101).

The processor 180 may grasp whether the NLP model-based image recognition model is stored in a memory 170 of the artificial intelligence apparatus 100 or a memory 230 of the artificial intelligence server 200 to determine whether the NLP model-based image recognition mode exists.

When the NLP model-based image recognition model does not exist as the result of the determination in step S1101, the processor 180 of the artificial intelligence apparatus 100 generates an NLP model-based image recognition model including the NLP model (S1103).

The processor 180 may generate the NLP model-based image recognition model including the NLP model stored in the memory 170 and store the generated NLP model-based image recognition model in the memory 170. Alternatively, the processor 180 may request the generation of the NLP model-based image recognition model to the artificial intelligence server 200 through a communication unit 110, and the processor 200 of the artificial intelligence server 200 may generate the NLP model-based image recognition model including the NLP model stored in the memory 230. The processor 260 of the artificial intelligence server 200 may store the generated NLP model-based image recognition model in the memory 230 or transmit the generated NLP model-based image recognition model to the artificial intelligence apparatus 100 through the communication unit 210.

The processor 180 of the artificial intelligence apparatus 100 or the processor 260 of the artificial intelligence server 200 may duplicate the NLP model to generate the NLP model-based image recognition model having the same structure as the NLP model. Alternatively, the processor 180 of the artificial intelligence apparatus 100 or the processor 260 of the artificial intelligence server 200 may add at least one or more layers to the duplicated NLP model to generate the NLP model-based image recognition model. That is, the generated NLP model-based image recognition model is managed as a separate model that is separate from the NLP model.

When the NLP model-based image recognition model exists as the result of the determination in step S1101, or the NLP model-based image recognition model is generated according to step S1103, the processor 180 of the artificial intelligence apparatus 100 learns the NLP model-based image recognition model by using the image training data (S1105).

The image training data is training data used for learning the image recognition model and may include image data and recognition information on an object included in the image data and label information.

The processor 180 or the learning processor 130 may learn the NLP model-based image recognition model by using the image training data stored in the memory 170 of the artificial intelligence apparatus 100. Alternatively, the processor 180 may request the learning of the NLP model-based image recognition model to the artificial intelligence server 200 through a communication unit 110, and the processor 260 or the learning processor 240 of the artificial intelligence server 200 may learn the NLP model-based image recognition model by using image training data stored in the memory 230. The processor 260 of the artificial intelligence server 200 may store the learned NLP model-based image recognition model in the memory 230 or transmit the learned NLP model-based image recognition model to the artificial intelligence apparatus 100 through the communication unit 210.

The processor 180 or the learning processor 130 of the artificial intelligence apparatus 100, or the processor 260 or the learning processor 240 of the artificial intelligence server 200 may update the NLP model-based image recognition model by using not only the training data used for learning the existing image recognition model but also the training data generated based on the currently received image data. The updating of the NLP model-based image recognition model by using the generated training data may mean that the NLP model-based image recognition model is additionally learned using the generated training data.

As described above, as the NLP model is provided as the artificial neural network including the convolutional neural network, the NLP model-based image recognition model may also be provided as an artificial neural network including a convolutional neural network. The situation in which the NLP model-based image recognition model is provided as the artificial neural network including the convolutional neural network and is learned using the image training data may be similar to the situation in which the image recognition model is provided as the artificial neural network including the convolutional neural network and is learned using the image training data. However, since the image recognition model is learned using only the image training data, there is a limitation in which an object that is not learned is not recognized from the image training data. On the other hand, since the NLP model-based image recognition model may be generated and learned by including the NLP model and the NLP model may output object recognition information corresponding to a text input by being learned using text training data, the NLP model-based image recognition model may have possibility of recognizing an object that is not learned from the image training data as long as the object can be recognized by the NLP model and also may be learned to recognize the object from the image data through only a much smaller amount of image training data.

Figure 12:
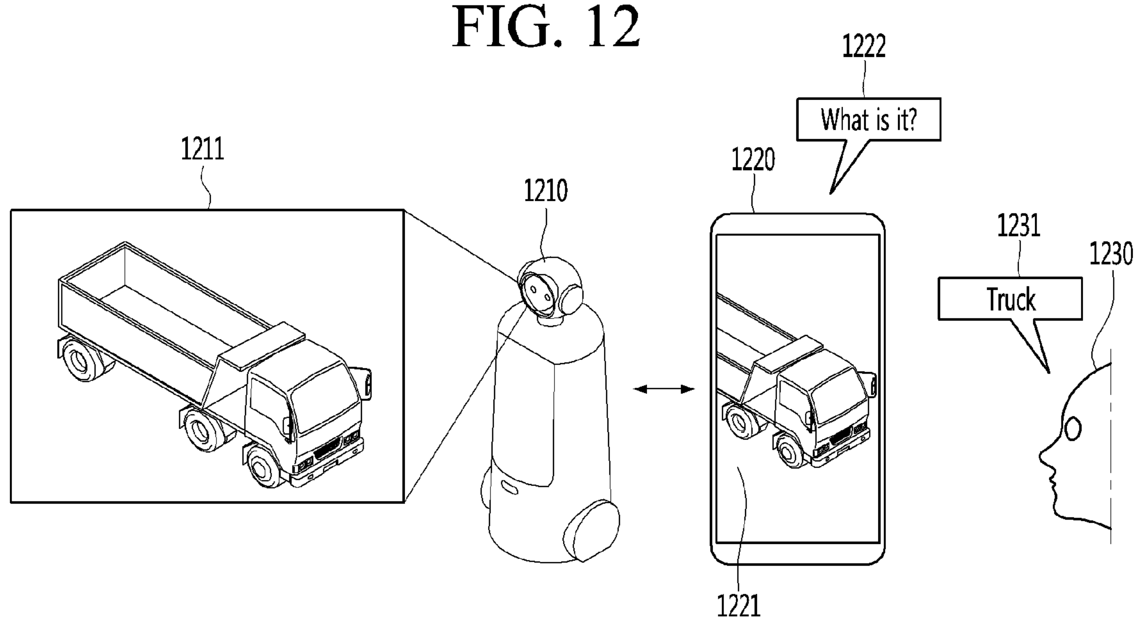
FIG. 12 is a view according to an embodiment of the present disclosure.

FIG. 12 is a view according to an embodiment of the present disclosure.

Referring to FIG. 12, an artificial intelligence apparatus 1210 may be an artificial intelligence robot. Also, the artificial intelligence apparatus 1210 may communicate with a user terminal 1220 through a communication unit 110.

The artificial intelligence apparatus 1210 or the artificial intelligence robot may receive image data 1211 including a truck through a camera 121 and transfer the received image data 1211 to a user terminal 1220 through the communication unit 110. The user terminal 1220 may output the received image data 1211 from a display unit 1221.

The artificial intelligence apparatus 1210 may attempt to recognize a truck, which is an object included in the image data 1211 received using the image recognition model, and attempt to recognize an object by using an NLP model-based image recognition model when the object recognition using the image recognition model has failed.

If the artificial intelligence apparatus 1210 fails to recognize an object even using an NLP model-based image recognition model, the artificial intelligence apparatus 1210 may transmit an output signal for requesting label information to a user terminal 1220 through a communication unit 110, and the user terminal 1220 may output a voice, text, or an image such as "What is it?" 1222 through a sound output unit or a display unit to request an input of label information on an object included in image data 1211. The user 1230 may provide the label information by speaking "Truck" 1231 according to the request of the user terminal 1220, and the user terminal 1220 may transmit the acquired label information to the artificial intelligence apparatus 1210. In addition, the artificial intelligence apparatus 1210 may generate training data including the image data 1211 and the received label information by using the received label information. The training data generated as described above may be used for learning an NLP model-based image recognition model and may also be used for learning an image recognition model. Here, the artificial intelligence apparatus 1210 may acquire the label information from the spoken voice 1231 of the user 1230 by using a natural language processing model.

In another embodiment, if there is a label information input of the user 1230 even when the user terminal 1222 does not request the label information, the user terminal 1222 may transmit the input label information to the artificial intelligence apparatus 1210, and the artificial intelligence apparatus 1210 may generate training data by using the input label information.

In FIG. 12, the user terminal 1220 is illustrated in the form of a mobile terminal such as a smartphone, but the present disclosure is not limited thereto. For example, the user terminal 1220 may be implemented as a head mounted display (HMD) device, and the HMD may output image data 1211 and augmented reality contents generated corresponding to the HMD. The augmented reality content may include object recognition information on an object included in the image data 1211.

Figure 13:
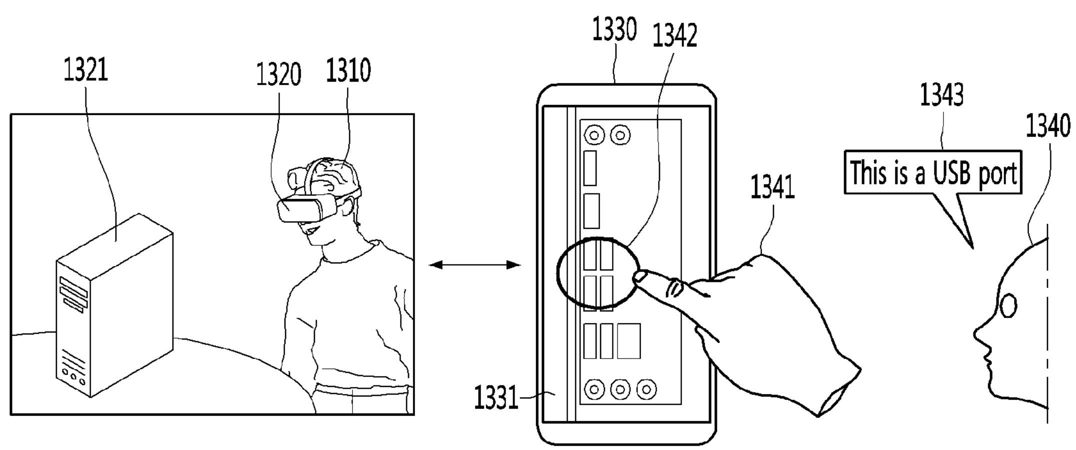
FIG. 13 is a view according to an embodiment of the present disclosure.

FIG. 13 is a view according to an embodiment of the present disclosure.

Referring to FIG. 13, an artificial intelligence apparatus 1320 according to an embodiment may be an artificial intelligence head mounted display (HMD). Also, the artificial intelligence apparatus 1320 may communicate with a user terminal 1330 through a communication unit 110.

An artificial intelligence apparatus 1320 or an artificial intelligence head mounted display may receive image data including a desktop computer 1321 through a camera 121 and also transmit image data received through a communication unit 110 to a user terminal 1330. The user terminal 1330 may output the received image data through a display unit 1331. A first user 1310 may watch output image data which includes the desktop computer 1321.

The artificial intelligence apparatus 1210 may attempt to recognize an object such as a terminal or a button of a desktop computer in image data received using an image recognition model and attempt to recognize an object by using an NLP model-based image recognition model when the object recognition using the image recognition model has failed. The artificial intelligence apparatus 1320 may display both the received image data and the recognized object information on the display unit.

A second user 1340 may watch an image 1331 watched by the first user 1310 through the artificial intelligence apparatus 1320 using the user terminal 1330, and thus, the second user 1340 may provide remote guide with respect to the first user 1310. The user terminal 1330 may transmit the spoken voice of the second user 1340 to the artificial intelligence apparatus 1320 so that the first user 1310 is offered the voice guide. Furthermore, the user terminal 1330 may transmit the spoken voice of the second user 1340 to the artificial intelligence apparatus 1320, and the artificial intelligence apparatus 1320 may acquire label information on an object based on the spoken voice of the second user 1340 to generate training data based on the received image data and the acquired label information. The training data generated as described above may be used for learning an NLP model-based image recognition model and may also be used for learning an image recognition model.

For example, the second user 1340 may select 1342 a specific point on the image 1331 displayed by the user terminal 1330 by using a hand 1341 and speak that the voice is "This is a USB port" 1333 to provide the label information, and the user terminal 1330 may transmit the selection information and the spoken voice 1243 of the second user 1340 to the artificial intelligence apparatus 1320 through the communication unit. The artificial intelligence apparatus 1320 may acquire the label information from the spoken voice 1343 received from the user terminal 1330 to generate the training data based on the received selection information and the acquired label information. Furthermore, the artificial intelligence apparatus 1320 may map and output an object corresponding to the selection information received from the image output from the display unit and the acquired label information corresponding to the received selection information based on the received selection information and the acquired label information.

According to an embodiment of the present disclosure, the above-described method may be implemented as a processor-readable code in a non-transitory computer readable storage medium where a program is recorded, which can include a hard disk drive (HDD), a solid state drive (SSD), a silicon disk drive (SDD), read-only memory (ROM), random access memory (RAM), CD-ROM, a magnetic tape, a floppy disk, and an optical data storage device.

According to the various embodiments of the present disclosure, even if the recognition of the object included in the image data by the image recognition model has failed, the object included in the image data may be subsidiarily recognized using the NLP model-based image recognition model to supplement the recognition of the image recognition function.

In addition, according to various embodiments of the present disclosure, since the NLP model-based image recognition model is generated and learned based on the previously learned NLP model, the NLP model-based image recognition model may be effectively learned through only the small amount of training data.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Other implementations are within the scope of the following claims.

What is claimed is:

1. An artificial intelligence apparatus for recognizing an object included in image data, the artificial intelligence apparatus comprising:

a camera;

a communication modem;

a memory configured to store an image recognition model, a natural language processing (NLP) model, and an NLP model-based image recognition model learned based on the NLP model; and a processor configured to:

receive image data from the camera or the communication modem, generate first recognition information on the object included in the image data by recognizing the object using the image recognition model, in response to the recognizing the object using the image recognition model being unsuccessful, generate second recognition information on the object included in the image data based on recognizing the object using the NLP model-based image recognition model, in response to the recognizing the object included in the image data using the NLP model based image recognition model being unsuccessful, transmit an output signal for requesting an input of label information to an external terminal through the communication modem, and receive the label information from the external terminal through the communication modem, wherein the processor is further configured to:

in response to the second recognition information on the object being generated using the NLP model-based image recognition model, determine that recognition of the object using the NLP model-based image recognition model has failed when recognition reliability is lower than a predetermined reference value or the object is determined as an unknown object.

2. The artificial intelligence apparatus according to claim 1, wherein the image recognition model is trained with image training data including image data for training and an object corresponding to the image data for training as a label for recognizing the object included in input image data, wherein the NLP model is trained with text training data including a text for training and an object corresponding to the text for training as a label for recognizing the object corresponding to input text, and wherein the NLP model-based image recognition model recognizes the object included in the input image data.

3. The artificial intelligence apparatus according to claim 2, wherein the NLP model comprises a convolutional neural network (CNN), receives a matrix, which is generated by concatenating embedded vectors to each other, from words included in the input text in an input layer, and is learned using a machine learning algorithm or a deep learning algorithm.

4. The artificial intelligence apparatus according to claim 3, wherein the processor is further configured to:

generate the NLP model-based image recognition model comprising the NLP model, and learn the NLP model-based image recognition model by using the image training data.

5. The artificial intelligence apparatus according to claim 4, wherein the NLP model-based image recognition model has a same structure as the NLP model.

6. The artificial intelligence apparatus according to claim 4, wherein the NLP model-based image recognition model further comprises the NLP model and at least one or more layers.

7. The artificial intelligence apparatus according to claim 4, wherein the processor is further configured to:

input the image data into the NLP model-based image recognition model, and generate the second recognition information on the object based on an output of the NLP model-based image recognition model.

8. The artificial intelligence apparatus according to claim 7, wherein the processor is further configured to:

receive the label information corresponding to the image data based on user input, generate user based training data comprising the image data and the label information based on the user input, and update the NLP model-based image recognition model based on the user based training data based on the user input.

9. The artificial intelligence apparatus according to claim 8, wherein the user input is voice data, and wherein the processor is further configured to acquire the label information from the voice data by using the NLP model.

10. The artificial intelligence apparatus according to claim 8, wherein the communication modem is configured to communicate with the external terminal, and wherein the processor is further configured to:

transmit an output signal for displaying the image data on the external terminal through the communication modem, and receive the label information corresponding to the image data from the external terminal through the communication modem.

11. The artificial intelligence apparatus according to claim 10, wherein the processor is further configured to:

receive user selection information within the image data and the label information from the external terminal through the communication modem, and generate the training data based on the user selection information and the label information.

12. The artificial intelligence apparatus according to claim 1, further comprising:

a display unit, wherein the processor is further configured to output the image data through the display unit.

13. The artificial intelligence apparatus according to claim 12, wherein the processor is further configured to:

output the first or second recognition information corresponding to the object included in the image data together with the image data through the display unit.

14. The artificial intelligence apparatus according to claim 1, wherein the camera comprises at least one or more of a RGB camera, an IR camera, or a depth camera, and wherein the image data comprises at least one or more of RGB image data, IR image data, or depth image data.

15. The artificial intelligence apparatus according to claim 1, wherein the communication modem is configured to receive the image data from an external device comprising the camera, and wherein the external device comprises a CCTV, a head mount display, a robot, and a IoT camera.

16. A method for recognizing an object included in image data, the method comprising:

receiving the image data from a camera or a communication modem;

generating first recognition information on the object included in the image data by recognizing the object using an image recognition model;

in response to the recognizing the object using the image recognition model being unsuccessful, generating second recognition information on the object included in the image data by recognizing the object using an NLP model-based image recognition model learned based on a natural language pressing (NLP) model;

in response to the recognizing the object included in the image data using the NLP model based image recognition model being unsuccessful, transmitting an output signal for requesting an input of label information to an external terminal through the communication modem; and receiving the label information from the external terminal through the communication modem, wherein the method further comprises:

in response to the second recognition information on the object being generated using the NLP model-based image recognition model, determining that recognition of the object using the NLP model-based image recognition model has failed when recognition reliability is lower than a predetermined reference value or the object is determined as an unknown object.

17. A non-transitory computer readable recording medium having recorded thereon a computer program for controlling a processor to perform a method for recognizing an object included in image data is recorded, the method comprising:

receiving the image data from a camera or a communication modem;

generating first recognition information on the object included in the image data by recognizing the object using an image recognition model;

in response to the recognizing the object using the image recognition model being unsuccessful, generating second recognition information on the object included in the image data by recognizing the object using an NLP model-based image recognition model learned based on a natural language pressing (NLP) model;

in response to the recognizing the object included in the image data using the NLP model based image recognition model being unsuccessful, transmitting an output signal for requesting an input of label information to an external terminal through the communication modem; and receiving the label information from the external terminal through the communication modem, wherein the method further comprises:

in response to the second recognition information on the object being generated using the NLP model-based image recognition model, determining that recognition of the object using the NLP model-based image recognition model has failed when recognition reliability is lower than a predetermined reference value or the object is determined as an unknown object.

* * * * *